(12) United States Patent
Kim et al.

(10) Patent No.: US 12,393,820 B2
(45) Date of Patent: Aug. 19, 2025

(54) SMART CARD

(71) Applicant: Samsung Electronics Co., Ltd., Suwon-si (KR)

(72) Inventors: Kyeongdo Kim, Suwon-si (KR); Minhyeok Kang, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 18/356,292

(22) Filed: Jul. 21, 2023

(65) Prior Publication Data
US 2024/0242059 A1 Jul. 18, 2024

(30) Foreign Application Priority Data
Jan. 17, 2023 (KR) .................. 10-2023-0006954

(51) Int. Cl.
G06K 19/06 (2006.01)
G05F 1/575 (2006.01)
G06K 19/077 (2006.01)
H02M 7/06 (2006.01)

(52) U.S. Cl.
CPC ....... *G06K 19/07773* (2013.01); *G05F 1/575* (2013.01); *H02M 7/06* (2013.01)

(58) Field of Classification Search
CPC ......... G06K 19/0723; G06K 19/07779; G06K 19/077; G06K 19/07773; G06K 19/07; G05F 1/575; G05F 1/613; G05F 1/56
USPC ................................. 235/492, 487
See application file for complete search history.

(56) References Cited

U.S. PATENT DOCUMENTS

| | | | |
|---|---|---|---|
| 6,630,858 B1 | 10/2003 | Takabayashi | |
| 7,218,204 B2 | 5/2007 | Hayashi | |
| 9,354,646 B2 | 5/2016 | Kim et al. | |
| 10,243,554 B2 | 3/2019 | Rachupalli et al. | |
| 11,055,598 B2 * | 7/2021 | Kim | H02M 1/08 |
| 11,586,873 B2 | 2/2023 | Kim et al. | |
| 2005/0040885 A1 | 2/2005 | Hayashi | |
| 2007/0246546 A1 * | 10/2007 | Yoshida | H04B 5/28 235/492 |
| 2013/0223116 A1 * | 8/2013 | Cho | G06K 19/0715 363/127 |

(Continued)

FOREIGN PATENT DOCUMENTS

| | | |
|---|---|---|
| CN | 110020704 A | 7/2019 |
| JP | 3871667 B2 | 1/2007 |

(Continued)

*Primary Examiner* — Daniel St Cyr
(74) *Attorney, Agent, or Firm* — Harness, Dickey & Pierce, P.L.C.

(57) ABSTRACT

A smart card may include: an antenna configured to receive at least one radio signal; a load circuit that is connected to both ends of the antenna; a rectifier configured to rectify the at least one radio signal received through the antenna, and provide the rectified signal to an output terminal; and a power generator including a voltage regulator, a first diode, and a second diode, the voltage regulator configured to provide an internal voltage, the first diode and the second diode connected in series between the output terminal of the rectifier and a first node, and the first node is configured to receive the internal voltage during a first mode of the smart card, the first mode being a mode during which a load of the load circuit is modulated.

20 Claims, 10 Drawing Sheets

(56) References Cited

U.S. PATENT DOCUMENTS

| | | | |
|---|---|---|---|
| 2013/0337744 A1* | 12/2013 | Lefley | H04B 5/79 455/90.3 |
| 2014/0266414 A1 | 9/2014 | Kim et al. | |
| 2019/0213459 A1* | 7/2019 | Kim | H02M 1/08 |
| 2021/0334618 A1 | 10/2021 | Kim et al. | |

FOREIGN PATENT DOCUMENTS

| | | |
|---|---|---|
| KR | 20190084763 A | 7/2019 |
| KR | 102068653 B1 | 1/2020 |
| KR | 20220000319 A | 1/2022 |

\* cited by examiner

SMART CARD

CROSS-REFERENCE TO RELATED APPLICATION

This U.S. non-provisional application claims the benefit of priority to Korean Patent Application No. 10-2023-0006954 filed in the Korean Intellectual Property Office on Jan. 17, 2023, the entire contents of which are incorporated herein by reference.

BACKGROUND

Various example embodiments of the inventive concepts relate to a smart card, a contactless smart card system, and/or methods of operating the smart card, etc.

In a contactless smart card system, an electric field is formed between a transmitting terminal and a receiving terminal, and wireless signals are transmitted and received through the same carrier, e.g., the electric field. When the transmitting terminal generates a wireless signal, the receiving terminal should not generate noise to ensure and/or improve the transmission of the wireless signal, but because the receiving terminal generates power from the electric field generated by the transmitting terminal, noise may be generated by the power operation of the receiving terminal. To remedy this problem, the receiving terminal may use a regulator which fixes a load impedance. However, signal distortion may occur when the receiving terminal transmits a wireless signal to the transmitting terminal due to the fixed load impedance.

The above information disclosed in this Background section is only for enhancement of understanding of the background of the example embodiments, and therefore it may contain information that does not form prior art that is already known in this country to a person of ordinary skill in the art.

SUMMARY

Various example embodiments provide a smart card which does not cause signal distortion and/or decreases signal distortion in a transmission signal, a contactless smart card system including the smart card, and/or methods of operating the smart card, etc.

A smart card according to at least one example embodiment of the inventive concepts includes: an antenna configured to transmit and receive at least one radio signal, a load circuit that is connected to both ends of the antenna, a rectifier configured to rectify the at least one radio signal received through the antenna, and provide the rectified signal to an output terminal, and a power generator including a voltage regulator, a first diode, and a second diode, the voltage regulator configured to provide an internal voltage, the first diode and the second diode connected in series between the output terminal of the rectifier and a first node, and the first node is configured to receive the internal voltage during a first mode of the smart card, the first mode being a mode during which a load of the load circuit is modulated.

The first diode may be a diode-connected first transistor, and the second diode may be a diode-connected second transistor.

The first transistor may be connected between the output terminal of the rectifier and a second node and the second transistor may be connected between the second node and the first node, the first transistor is configured to be in an on-state during a second mode of the smart card, the second mode being a mode during which the load of the load circuit is not modulated, and the second transistor is configured to control a voltage of the second node during the second mode.

The power generator is further configured to amplify a difference between a voltage corresponding to the voltage of the second node and a desired reference voltage.

The smart card may further include a power controller configured to diode-connect the first transistor and the second transistor during the first mode, turn on the first transistor, and control the second transistor to maintain a voltage of a second node at a constant level during a second mode of the smart card during which the load of the load circuit is not modulated.

The load circuit may include a first resistor, a modulation switch, and a second resistor connected to the both ends of the antenna, in response to the modulation switch being on, a rectified voltage follows the internal voltage, the rectified voltage being a voltage of the output terminal of the rectifier, and in response to the modulation switch being off, the rectified voltage follows a voltage obtained based on a threshold voltage of the first diode, a threshold voltage of the second diode, and the internal voltage.

The voltage regulator is further configured to amplify a difference between a voltage corresponding to the voltage of the first node and a desired reference voltage.

A smart card according to at least one example embodiment of the inventive concepts includes: an antenna configured to transmit and receive at least one radio signal, a load circuit that is connected to both ends of the antenna, a rectifier configured to rectify the at least one radio signal received through the antenna, and provide the rectified signal to an output terminal, a switching circuit connected between the output terminal and a first node, a conversion circuit connected between the first node and a second node, a voltage regulator connected to the second node, and the voltage regulator configured to control an internal voltage to be constant, the internal voltage being a voltage of the second node, and the switching circuit and the conversion circuit are configured to operate as diodes during a first mode of the smart card, the first mode being a mode during which the load of the load circuit is modulated.

The switching circuit may include: a transistor connected between the output terminal and a first node, and a multiplexing circuit which includes an output terminal connected to a gate of the transistor, a first input terminal configured to receive an on-level voltage of the transistor, and a second input terminal connected to a drain of the transistor.

The multiplexing circuit is configured to connect the output terminal and the second input terminal during the first mode, and connect the output terminal and the first input terminal during a second mode of the smart card, the second mode being a mode during which a load of the load circuit is not modulated.

The conversion circuit is configured to operate as a voltage regulator which maintains the voltage of the first node at a constant level during the second mode.

The conversion circuit may include: a transistor connected between the first node and the second node; an error amplifier configured to amplify a difference between a voltage corresponding to the first node and a desired reference voltage, and a multiplexing circuit including an output terminal, a first input terminal and a second input terminal, the output terminal connected to a gate of the transistor, the first input terminal connected to the output terminal of the error amplifier, and the second input terminal connected to a drain of the transistor.

The multiplexing circuit is further configured to: connect the output terminal and the second input terminal during the first mode; and connect the output terminal and the first input terminal during a second mode of the smart card, the second mode being a mode during which a load of the load circuit is not modulated.

The switching circuit may be in an on-state during the second mode.

The voltage regulator may include: a transistor connected to the second node; and an error amplifier including an output terminal connected to a gate of the transistor, the error amplifier configured to amplify and output a difference between the voltage corresponding to the voltage of the second node and a desired reference voltage.

During a second mode during which a load of the load circuit is not modulated, the switching circuit is configured to be in an on-state, and the conversion circuit is configured to operate as a voltage regulator which maintains a voltage of the first node to be constant.

The conversion circuit may include: a transistor that is connected between the first node and the second node; and an error amplifier configured to amplify a difference between the voltage corresponding to the first node and a desired reference voltage, and output the amplified difference to a gate of the transistor.

The load circuit may include a first resistor, a modulation switch, and a second resistor connected between both ends of the antenna, in response to the modulation switch being on, the load circuit is configured to adjust a rectified voltage based on the internal voltage, the rectified voltage being a voltage of the output terminal of the rectifier, and in response to the modulation switch being off, the load circuit is configured to adjust the rectified voltage based on a desired threshold voltage of a diode provided by the switching circuit and a desired threshold voltage of a diode provided by the conversion circuit.

A smart card according to at least one example embodiment of the inventive concepts includes: an antenna configured to receive at least one radio signal; a rectifier configured to rectify the at least one radio signal received by the antenna, a load circuit which is connected to both ends of the antenna, the load circuit including a modulation switch, a load modulator configured to generate a load modulation signal based on transmission data, and a power generator including a voltage regulator, the voltage regulator configured to provide a desired internal voltage, and during a transmission mode of the smart card in which the modulation switch operates based on the load modulation signal, the voltage regulator is further configured to adjust a rectifier voltage at an output terminal to a level obtained based on desired threshold voltages of at least two diodes and the internal voltage in response to the modulation switch being on, and set the rectified voltage to the internal voltage in response to the modulation switch being off.

The at least two diodes includes a first diode connected between an output terminal of the rectifier and a first node, and a second diode connected between the first node and a second node, and the internal voltage may be supplied to the second node.

DETAILED DESCRIPTION

Figure 1:
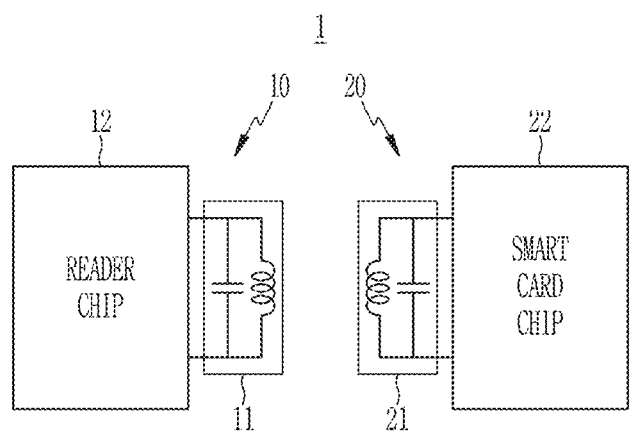
FIG. 1 is a block diagram of a smart card system according to at least one example embodiment.

In the following detailed description, only certain example embodiments of the inventive concepts have been shown and described, simply by way of illustration. As a person of ordinary skill in the art will realize, the described example embodiments may be modified in various different ways, all without departing from the spirit or scope of the inventive concepts.

Accordingly, the drawings and description are to be regarded as illustrative in nature and not restrictive. Like reference numerals designate like elements throughout the specification. In the flowchart described with reference to the drawing, the order of operations may be changed, several operations may be merged, a certain operation may be divided, and/or a specific operation may not be performed, etc.

In addition, expressions written in the singular can be interpreted as singular or plural, unless explicit expressions such as "one" or "single" are used. Terms containing ordinal numbers, such as first and second, may be used to describe various configurations elements, but constituent elements are not limited by these terms. These terms may be used for the purpose of distinguishing one constituent element from another.

According to at least one example embodiment, a smart card may be a wireless contactless IC card among various IC card types, and the smart card may operate, for example, according to the ISO/IEC 14443 protocol, but the example embodiments are not limited thereto. The protocol defines a protocol for the physical characteristics, radio frequency (RF) power supply, signal access, initialization, and collision prevention of a proximity type of IC card among contactless type IC cards. According to ISO/IEC 14443, a contactless type IC card may include an integrated circuit (IC) to perform processing and/or memory functions, etc.

The contactless type IC card may exchange wireless signals (e.g., radio signals, RF signals, etc.) and receive power through inductive coupling with a proximity coupling device, that is, a card reader, without using a galvanic element. A card reader combined with a contactless IC card may generate energy in a radio frequency (RF) field and transmit power to the contactless IC card. A frequency fc of the RF signal is 13.56 MHz±7 kHz, but the example embodiments are not limited thereto.

A smart card device according to at least one example embodiment may include a conversion circuit and/or a switching circuit, etc., but is not limited thereto. Depending on the operation modes of the smart card, the generation of noise (e.g., RF interference, etc.) due to power operation during the transmission operation of the smart card may be decreased and/or prevented by changing the operation of each of the conversion circuit and switching circuit. For example, in a reception mode in which a smart card receives a RF signal, a conversion circuit operates as a voltage regulator to regulate a rectified voltage, and a switching element may be turned on and may have a small impedance (e.g., a relatively small impedance in comparison to the voltage regulator, etc.). In a transmission mode in which the smart card transmits a RF signal, the conversion circuit and switching element may operate as a diode, but is not limited thereto.

FIG. 1 is a block diagram of a smart card system according to at least one example embodiment.

As shown in FIG. 1, a smart card system 1 may include a card reader 10 and/or a smart card 20, etc., but is not limited thereto, and for example, may include a greater or lesser number of constituent elements. The card reader 10 may include an antenna 11 and/or a reader chip 12, etc., and the smart card 20 may include an antenna 21 and/or a smart card chip 22, etc.

The smart card 20 may generate power by receiving a radio signal, RF signal, wireless signal, etc., from the card reader 10 through wireless communication with the card reader 10 in a contactless manner through the antenna 21, perform at least one operation according to and/or based on at least one control instruction indicated by the radio signal provided from the card reader 10, and/or generate data according to and/or based on a result and/or transmit the data to the card reader 10, etc., but the example embodiments are not limited thereto. The smart card 20 and the card reader 20 may exchange radio, RF, and/or wireless signals in the form of electromagnetic waves through antennas 11 and 21, etc.

Figure 2:
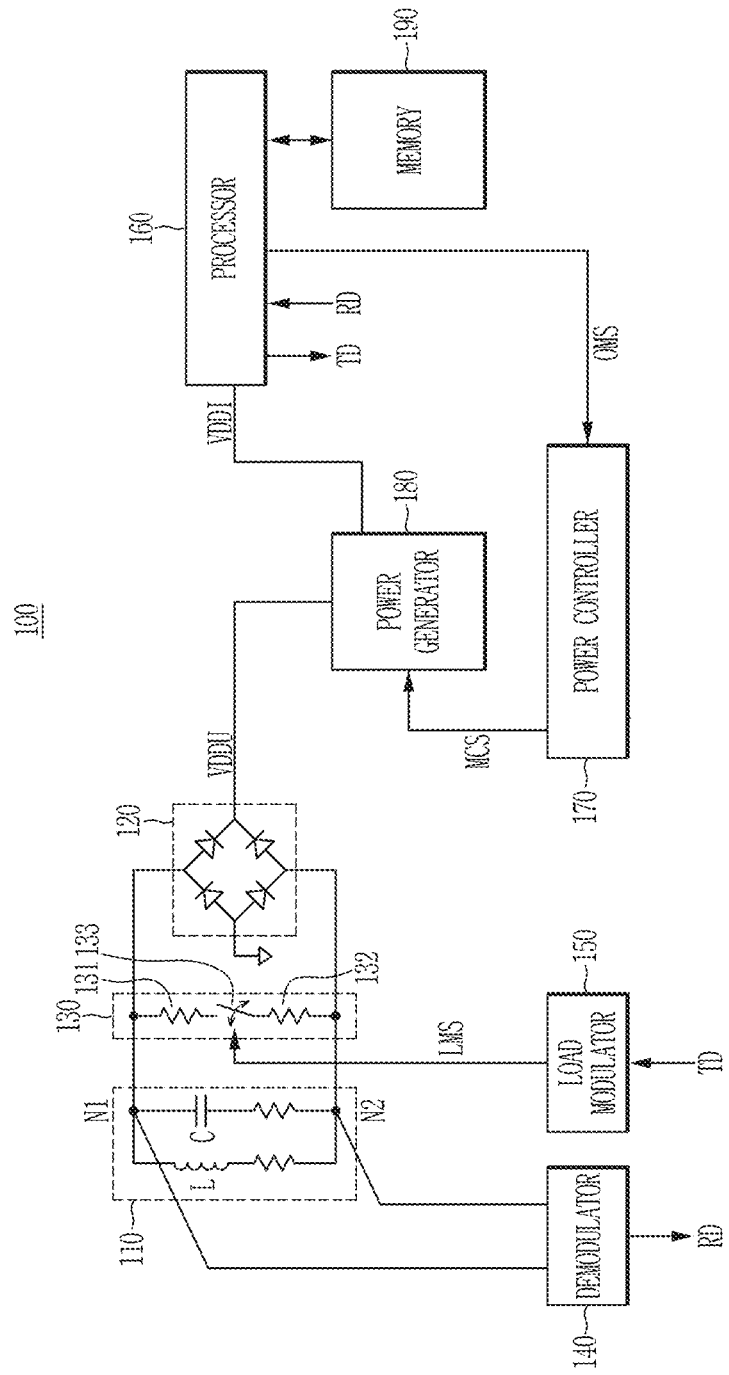
FIG. 2 is a block diagram of the smart card according to at least one example embodiment.

FIG. 2 is a block diagram of the smart card according to at least one example embodiment.

As shown in FIG. 2, the smart card 100 may include an antenna 110, a rectifier 120, a load circuit 130, a demodulator 140, a load modulator 150, at least one processor 160, at least one power controller 170, a power generator 180, and/or a memory 190, etc., but is not limited thereto. The smart card chip 22 of FIG. 1 may be implemented to include at least some of the rectifier 120, the load circuit 130, the demodulator 140, the load modulator 150, the processor 160, the power controller 170, the power generator 180, and/or the memory 190, etc. According to some example embodiments, the at least one processor 160, the at least one power controller 170, and/or the memory 190, may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The antenna 110 may transmit and/or receive at least one radio frequency (RF) signal (e.g., radio signal, wireless signal, etc.) for communication with the card reader 10. The antenna 110 may be modeled as an resistor-inductor-capacitor (R-L-C) equivalent circuit, but is not limited thereto. For example, an inductor L and a capacitor C of the antenna 110 may be connected in parallel between a node N1 and a node N2, and a resistance component of the antenna 110 may be connected to each of the inductor L and capacitor C, etc. The radio frequency signal transmitted from the card reader 10 may be converted into at least one electrical signal by electromagnetic induction by the inductor L and the capacitor C, etc. According to other example embodiments, the antenna 110 may be implemented using various other well-known structures. For example, the antenna 110 may be formed as a loop antenna structure, etc., but is not limited thereto.

The rectifier 120 may rectify at least one RF signal, e.g., a received radio signal, a received RF signal, a received wireless signal, etc., (hereinafter referred to as a received signal) derived and/or received through the antenna 110. The rectifier 120 is connected between both ends of the antenna 110 and may rectify a received signal. In FIG. 2, a full-bridge rectifier 120 implemented with four rectifier diodes D1 to D4 is shown, but the example embodiments are not limited thereto. For example, the rectifier 120 may be implemented using a half-wave rectifier structure, etc. Although it is not illustrated in FIG. 2, the smart card 100 may further include a smoothing circuit that smooths the voltage rectified by the rectifier 120, etc. The rectifier 120 is connected between nodes N1 and N2, which are both ends of the antenna 110, and may rectify voltage and/or current corresponding to and/or related to the received signal and induced by the antenna 110. An output end of the rectifier 120 is connected to the power generator 180 at a power node PN. A voltage at the output end of the rectifier 120 is hereinafter referred to as a rectified voltage VDDU.

During the transmission operation of the smart card 100, the load modulator 150 may generate a load modulation signal LMS according to and/or based on transmission data TD, and may supply the load modulation signal LMS to the load circuit 130. The load circuit 130 is connected to both ends of the antenna 110 (e.g., is connected in parallel to the ends N1 and N2 of the antenna 110) and may perform load modulation according to and/or based on the load modulation signal LMS supplied from the load modulator 150. The load circuit 130 may include a plurality of resistors, e.g., the two resistors 131 and 132 and/or a modulation switch 133, etc., but is not limited thereto. The resistor 131, the modulation switch 133, and/or the resistor 132 may be serially connected (e.g., connected in series) between the node N1 and the node N2, and the modulation switch 133 may operate switching according to and/or based on the load modulation signal LMS. When the modulation switch 133 is in an on state (e.g., a first state, etc.), a current induced by the antenna 110 flows in the load circuit 130, and the current flowing through the rectifier 120 may decrease. When the modulation switch 133 is in an off state (e.g., a second state, etc.), the load circuit 130 is an open circuit and thus the current induced in the antenna 110 may flow through the rectifier 120.

During the reception operation of the smart card 100, the demodulator 140 may demodulate the signal received by the antenna 110 and provide received data RD included in and/or embodied by the signal to the processor 160. The demodulator 140 is connected to the node N1 and the node N2, and a signal received by the antenna 110 may occur due to a voltage difference between the two nodes N1 and N2, but the example embodiments are not limited thereto. The demodulator 140 may generate the received data RD by demodulating at least one RF signal (e.g., radio signal, wireless signal, etc.) according to and/or based on a voltage difference between the two nodes N1 and N2, etc., but is not limited thereto.

The processor 160 operates by receiving an internal voltage VDDI, which is, for example, a constant voltage generated by the power generator 180, and may control the overall operation of the smart card 100, but the example embodiments are not limited thereto. The processor 160 may decode the received data RD and perform at least one operation according to and/or based on the decoded received data RD. For example, the processor 160 may read data from the memory 190 and/or store the received data RD in the memory 190 according to and/or based on at least one instruction indicated by the received data RD, but is not limited thereto. During the transmission operation of the smart card 100, the processor 160 may encode the data read from the memory 190 to generate transmission data TD and provide the transmission data TD to the load modulator 150, etc. The processor 160 may generate at least one operation mode signal OMS indicating the current operation of the smart card 100 and transmit it to the power controller 170. The smart card 100 may perform at least one of a reception operation from a reader, a processing operation according to and/or based on received data, and/or a transmission operation of transmitting the result of the processing operation, etc., but is not limited thereto. The processor 160 may generate and/or transmit the operation mode signal OMS indicating at least one of a receiving operation, a processing operation, and/or a transmission operation to the power controller 170, etc., but the example embodiments are not limited thereto.

The power controller 170 may control the power generator 180 according to and/or based on the operation mode signal OMS provided from the processor 160. When the operation mode signal OMS indicates a receiving operation and/or processing operation, the power controller 170 may generate a mode control signal MCS such that the power generator 180 operates in a normal mode, but is not limited thereto. The normal mode may mean a voltage regulating operation mode in which the load impedance of the smart card 100 is fixed and the rectified voltage VDDU maintains a constant level, but is not limited thereto. Additionally, when the operation mode signal OMS indicates a transmission operation, the power controller 170 may generate a mode control signal MCS such that the power generator 180 operates in transmission mode, etc. The transmission mode may mean an operation mode for generating a stable internal voltage VDDI without considering the level of the rectified voltage VDDU, but is not limited thereto. For example, in transmission mode, the power generator 180 operates as a low dropout LDO regulator, thereby decreasing and/or minimizing noise that may occur due to a regulator operation during load modulation, etc.

It has been described that the power controller 170 receives the operation mode signal OMS from the processor 160, but the example embodiments of the inventive concepts are not limited thereto. For example, the power controller 170 may detect the load modulation signal LMS to determine whether to activate/deactivate load modulation, etc. When the load modulation signal LMS is detected, the power controller 170 may control the power generator 180 in transmission mode, and when the load modulation signal LMS is not detected, the power controller 170 may control the power generator 180 in normal mode, etc., but the example embodiments are not limited thereto.

The power generator 180 may perform a regulating operation to maintain the rectified voltage VDDU to be constant at a desired and/or predetermined target level according to and/or based on the mode control signal MCS (e.g., normal mode, etc.), and/or may performing a regulating operation to maintain the internal voltage VDDI to be constant regardless of the level of the rectified voltage VDDU (e.g., transmission mode, etc.). In transmission mode, the power generator 180 may operate as a voltage regulator to suppress distortion or noise of a load-modulated transmission signal, but is not limited thereto. Then, the power generator 180 may supply the stable internal voltage VDDI in transmission mode and reduce a transmission error and/or decrease the amount of noise and/or RF interference generated by the power generator 180 and/or the smart card 100, etc.

As such, the smart card 100 may change the operation mode of the power generator 180 to reduce RF noise and/or RF interference generated during load modulation in transmission mode. Through this, distortion, noise, and/or interference, etc., of the load modulation waveform may be reduced, and errors in the transmission signal provided from the smart card 100 may be decreased and/or prevented, etc.

Figure 3:
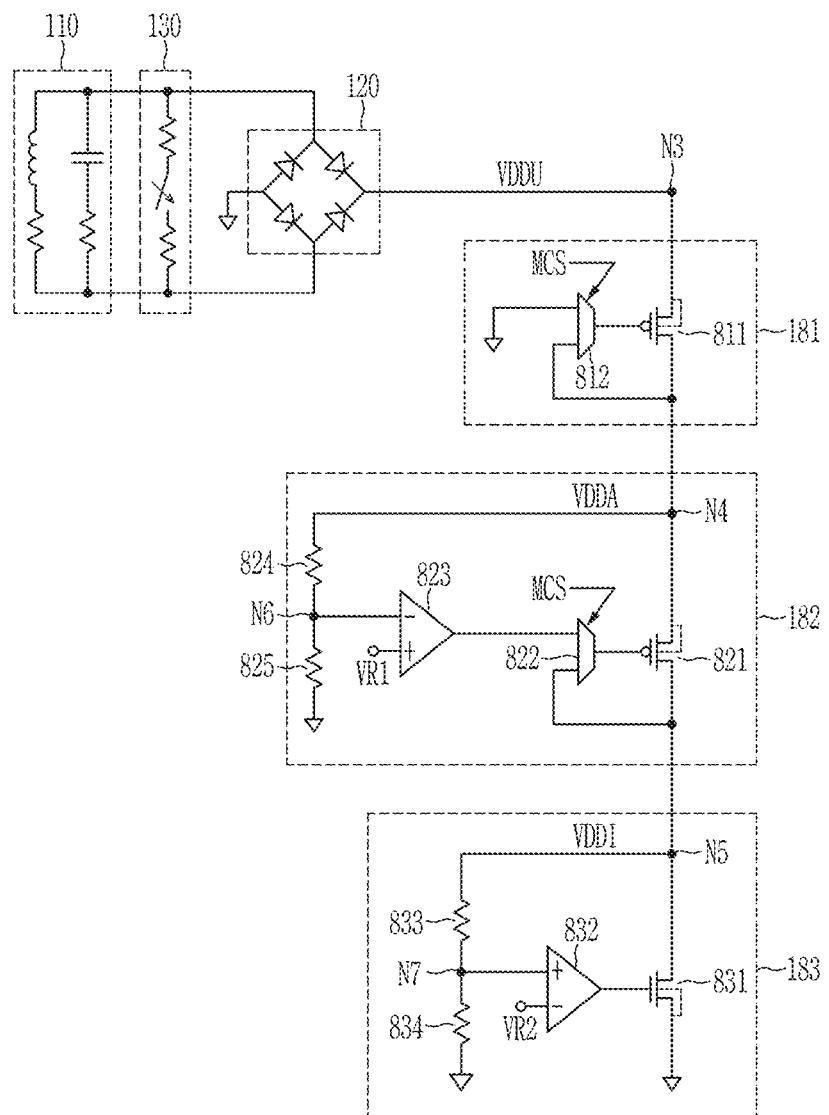
FIG. 3 is a circuit diagram of at least one example embodiment of the voltage regulator shown in FIG. 2.

FIG. 3 is a circuit diagram of at least one example embodiment of the voltage regulator shown in FIG. 2.

The power generator 180 may include at least one switching circuit 181, at least one conversion circuit 182, and/or a voltage regulator 183, etc., but is not limited thereto. In FIG. 3, the power generator 180 includes one switching circuit 181 and one conversion circuit 182, but this is an example and the example embodiments are not limited thereto.

The switching circuit 181 may include at least one transistor 811 and/or at least one multiplexing circuit 812, etc. The switching circuit 181 may be turned on or connected to a diode according to and/or based on the mode control signal MCS, etc.

According to at least one example embodiment, the source of the transistor 811 is connected to a node N3, a drain of the transistor 811 is connected to a node N4, and a gate of the transistor 811 is connected to an output terminal OT1 of the multiplexing circuit 812, but is not limited thereto. The multiplexing circuit 812 may connect one of the output terminal OT1 and two input terminals IN1 and IN2 according to the mode control signal MCS, etc. The output stage OT1 is connected to the gate of the transistor 811, the input stage IN1 is connected to the ground, and the input terminal IN2 is connected to the drain of the transistor 811, etc. In FIG. 3, the transistor 811 is implemented as a p channel type of transistor, but the example embodiments of the inventive concepts are not limited thereto, and the transistor 811 may be implemented as an n channel type of transistor. Under the control of the multiplexing circuit 812, the transistor 811 may be controlled to be diode connected or turned on.

The conversion circuit 182 may include at least one transistor 821, a multiplexing circuit 822, an error amplifier 823, and/or two resistors 824 and 825, but the example embodiments are not limited thereto. The conversion circuit 182 may operate as a voltage regulator and/or provide a diode (e.g., connect to a diode, etc.) according to and/or based on the mode control signal MCS. When the conversion circuit 182 operates as a voltage regulator, a voltage VDDA of the node N4 may be constantly regulated, but the example embodiments are not limited thereto.

According to at least one example embodiment, a source of the transistor 821 is connected to a node N4, a drain of transistor 821 is connected to a node N5, and a gate of the transistor 821 is connected to an output terminal OT2 of the multiplexing circuit 812, but the example embodiments are not limited thereto. The multiplexing circuit 822 may connect one of the output terminal OT2 and two input terminals IN3 and IN4 according to and/or based on the mode control signal MCS, but is not limited thereto. The output terminal OT2 is connected to the gate of the transistor 821, the input terminal IN3 is connected to an output terminal of the error amplifier 823, and the input terminal IN4 is connected to the drain of the transistor 821, but is not limited thereto. The negative input terminal (−) of the error amplifier 823 is connected to a node N6 of two resistors 824 and 825, a reference voltage VR1 is supplied to the positive input terminal (+) of the error amplifier 823, the resistor 824 is connected to the nodes N4 and N6, and the resistor 825 is connected between the node N6 and the ground, but the example embodiments are not limited thereto. The error amplifier 823 may amplify and output a voltage difference between the positive input terminal (+) and the negative input terminal (−). In FIG. 3, the transistor 821 is implemented as a p-channel type of transistor, but the example embodiments of the inventive concepts are not limited thereto, and the transistor 821 may be implemented as an n-channel type of transistor, etc. Under the control of the multiplexing circuit 822, the transistor 821 may be diode-connected and/or may operate according to and/or based on the output of the error amplifier 823, etc.

The voltage regulator 183 includes a transistor 831, an error amplifier 832, and/or two resistors 833 and 834, etc., but is not limited thereto. The voltage regulator 183 may constantly regulate the internal voltage VDDI, which is a voltage of the node N5. For example, the voltage regulator 183 may be an LDO regulator, etc.

According to at least one example embodiment, a drain of transistor 831 is connected to the node N5, a source of transistor 831 is connected to the ground, and a gate of transistor 831 is connected to an output terminal of the error amplifier 832, but is not limited thereto. A positive input terminal (+) of the error amplifier 832 is connected to a node N7 of two resistors 833 and 834, a negative input terminal (−) of the error amplifier 823 is supplied with the reference voltage VR2, the resistor 833 is connected between the node N5 and node N7, and the resistor 834 is connected between the node N7 and the ground, but the example embodiments are not limited thereto. In FIG. 3, the transistor 831 is implemented as an n-channel type of transistor, but the example embodiments of the inventive concepts are not limited thereto, and the transistor 831 may be implemented as a p-channel type of transistor, etc. Under the control of the multiplexing circuit 832, the transistor 831 may be diode-connected and/or may operate according to and/or based on an output of the error amplifier 833, etc.

Figure 4:
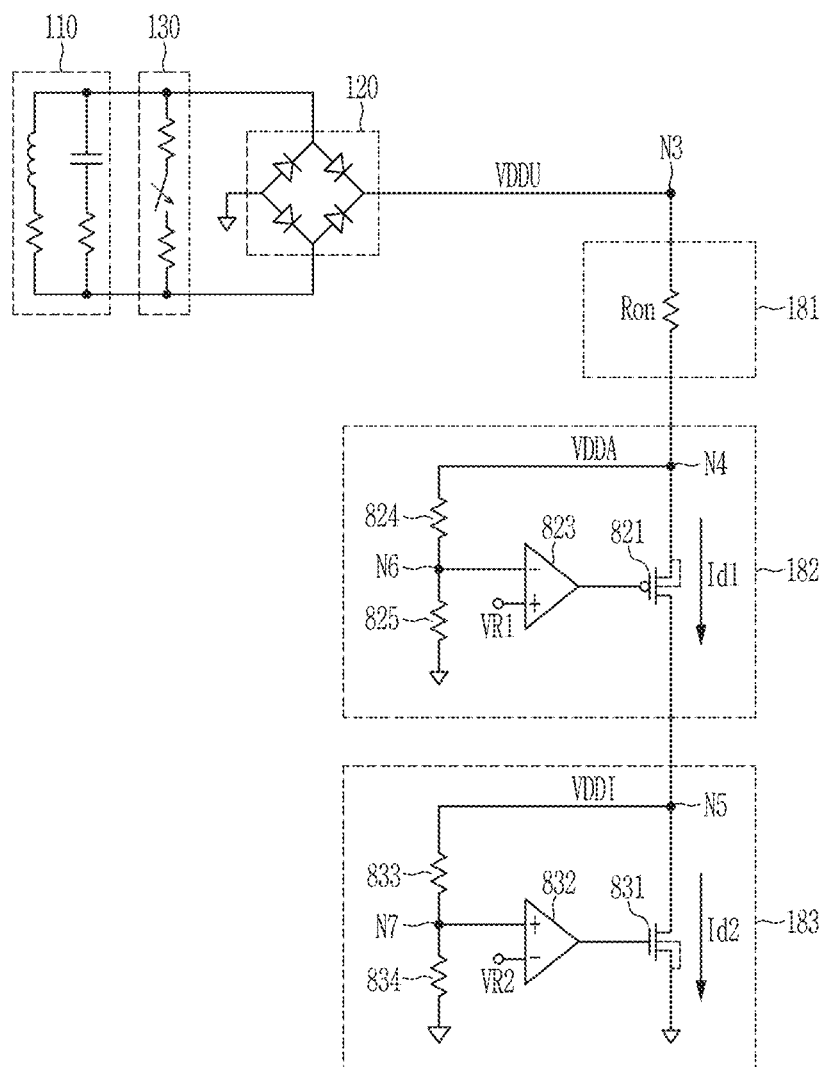
FIG. 4 is a circuit diagram that shows a connection state of the voltage regulator shown in FIG. 3 in a normal mode according to at least one example embodiment.

FIG. 4 is a circuit diagram that shows a connection state of the voltage regulator shown in FIG. 3 in a normal mode according to at least one example embodiment.

When the mode control signal MCS indicates a normal mode, the multiplexing circuit 812 may turn on the transistor 811 by connecting a gate of the transistor 811 to the ground, but is not limited thereto. Then, as shown in FIG. 4, the switching circuit 181 may be equivalently represented as a connection of on-resistance RON of the on-state transistor 811 between the node N3 and the node N4, but the example embodiments are not limited thereto.

When the mode control signal MCS indicates the normal mode, the multiplexing circuit 822 may connect the gate of the transistor 821 to an output terminal of the error amplifier 823, etc. Then, the conversion circuit 182 may operate as a voltage regulator, for example, an LDO regulator, but is not limited thereto. For example, the conversion circuit 182 may regulate the voltage VDDA of the node N4 to a constant level by adjusting the degree of conduction of the transistor 821 such that the voltage of the node N6 and the reference voltage VR1 are the same. In FIG. 4, the voltage VDDA may be a voltage dropped by the on-resistance Ron from the rectified voltage VDDU, but the on-resistance Ron may be very low such that the voltage VDDU and the voltage VDDA may be the same or substantially the same (e.g., the voltages of VDDU and VDDA may be within +/−10% of each other). The voltage VDDA is applied to the node N6 after being divided by the two resistors 824 and 825, etc.

When the voltage of the node N6 is higher than the reference voltage VR1, the output of the error amplifier 823 is reduced, the degree of conduction of the transistor 821 increases, and the on-resistance of the transistor 821 may be reduced. Then, a current Id1 flowing into the voltage regulator 182 increases, and the rectified voltage VDDU is correspondingly decreased by the increased current Id such that the voltage VDDA may also decrease. Conversely, when the voltage of the node N6 is lower than the reference voltage VR1, the output of the error amplifier 823 increases, the degree of conduction of the transistor 821 decreases, and the on-resistance of the transistor 821 may increase. Then, the current Id1 flowing into the voltage regulator 182 may decrease. Then, the rectified voltage VDDU may correspondingly increase due to the decreased current Id1 such that the voltage VDDA may also increase. In this way, the current Id1 flowing through the transistor 821 is adjusted and thus the voltage of the node N6 corresponding to the voltage VDDA is equal to the reference voltage VR1, thereby regulating the voltage VDDA at a constant level.

The voltage regulator 183 may regulate the internal voltage VDDI to a constant level by adjusting the degree of conduction of the transistor 831 such that the voltage of the node N7 and the reference voltage VR2 are the same or substantially the same (e.g., within +/−10% of each other). The voltage VDDI is applied to the node N7 after being divided by the two resistors 833 and 834.

When the voltage of the node N7 is higher than the reference voltage VR2, the output of the error amplifier 832 increases, the degree of conduction of the transistor 831 increases, and the on-resistance of the transistor 831 decreases. Then, the current Id2 flowing into the voltage regulator 183 increases, and the rectified voltage VDDU is correspondingly decreased by the increased current Id2 such that the voltage VDDA and the internal voltage VDDI may also decrease. Conversely, when the voltage of the node N7 is lower than the reference voltage VR2, the output of the error amplifier 832 decreases, the degree of conduction of the transistor 831 decreases, and the on-resistance of the transistor 831 increases. Then, the current Id2 flowing into the voltage regulator 183 decreases, and the rectified voltage VDDU increases correspondingly by the decreased current Id2 such that the voltage VDDA increases and the internal voltage VDDI may also increase. In this way, the current Id2 flowing through the transistor 831 is adjusted such that the voltage of the node N7 corresponding to the internal voltage VDDI is equal to the reference voltage VR2, thereby regulating that the internal voltage VDDI at a constant level, etc.

Since resistance values of a plurality of resistors 824, 825, 833, and 834 are very large compared to resistance values that transistors 821 and 823 may have when operating in a normal mode, the current Id1 and the current Id2 are the same current and/or substantially the same current (e.g., within +/−10%).

Figure 5:
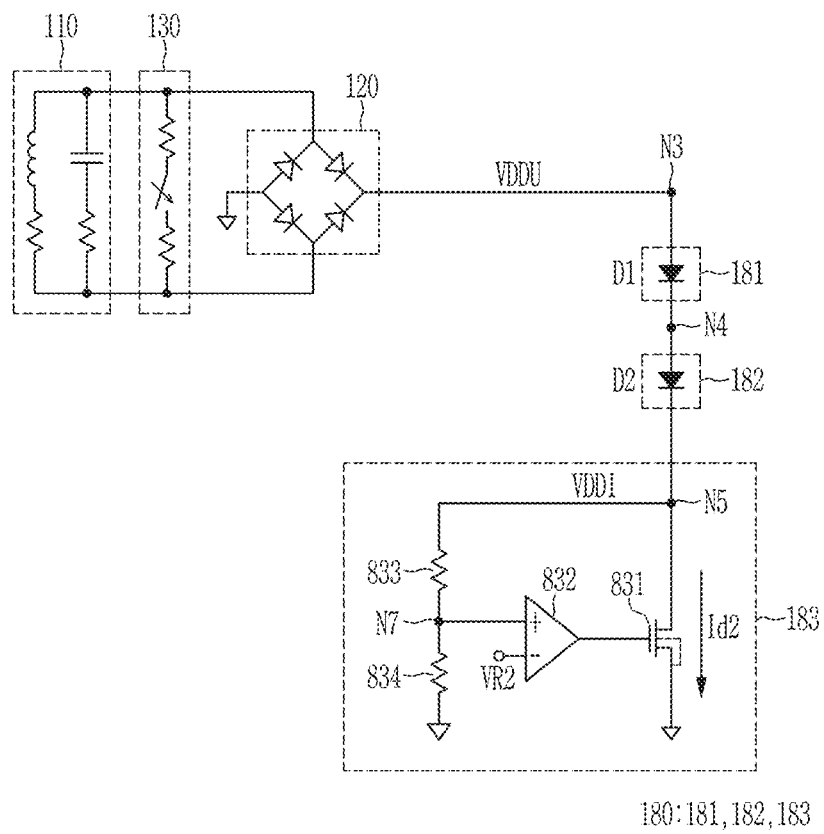
FIG. 5 is a circuit diagram showing a connection state of the voltage regulator shown in FIG. 3 in a transmission mode according to at least one example embodiment.

FIG. 5 is a circuit diagram showing a connection state of the voltage regulator shown in FIG. 3 in a transmission mode according to at least one example embodiment.

When the mode control signal MCS indicates the transmission mode, the multiplexing circuit 812 may diode-connect the transistor 811 by connecting the gate and the drain of the transistor 811. As shown in FIG. 5, the switching circuit 181 may be represented by a diode D1, but is not limited thereto.

When the mode control signal MCS indicates the transmission mode, the multiplexing circuit 822 may diode-connect the transistor 821 by connecting the gate and the drain of the transistor 821. As shown in FIG. 5, the conversion circuit 182 may be represented by a diode D2, but is not limited thereto.

The operation of the voltage regulator 183 has been previously described in FIG. 4, and therefore the description is omitted.

In the transmission mode, a high level of the rectified voltage VDDU according to load modulation may be a voltage (e.g., VDDI+VTH1+VTH2, etc.) obtained based on the desired threshold voltages VTH1 and VTH2 of the two diodes D1 and D2 to the internal voltage VDDI of the load circuit 130, e.g., by adding desired threshold voltages VTH1 and VTH2 of the two diodes D1 and D2 to the internal voltage VDDI of the load circuit 130, etc. In the transmission mode, a low level of the rectified voltage VDDU according to and/or base don load modulation may be the same voltage (or substantially the same, e.g., within +/−10%) as the internal voltage VDDI, etc. For example, when the modulation switch 133 is in an on-state, no current flows through the rectifier 120, and thus the diodes D1 and D2 do not conduct. Then, the rectified voltage VDDU may be the same and/or substantially the same voltage (e.g., within +/−10%) as the internal voltage VDDI provided by the voltage regulator 183, but is not limited thereto. When the modulation switch 133 is in an off-state, the current flowing into the power generator 180 through the rectifier 120 flows through the two diodes D1 and D2, and thus the rectified voltage VDDU may be controlled by a voltage added by the threshold voltages VTH1 and VTH2 of the two diodes D1 and D2 at the internal voltage VDDI, but the example embodiments are not limited thereto.

Figure 6:
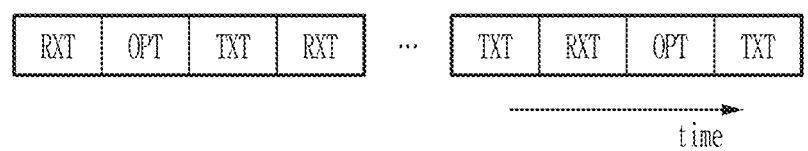
FIG. 6 schematically shows the operation of a smart card according to at least one example embodiment in a time domain.

FIG. 6 schematically shows the operation of a smart card according to at least one example embodiment in a time domain.

As shown in FIG. 6, the smart card 100 demodulates at least one RF signal received through the antenna 110 during a receiving period RXT to generate received data, operates according to and/or based on the received data during a processing period OPT to generate transmission data, and transmits the transmission data through load modulation for the antenna 110 during the transmission period TXT, but the example embodiments are not limited thereto. In the time domain, the receiving period, the processing period, and the transmission period may be repeated, but is not limited thereto.

Figure 7:
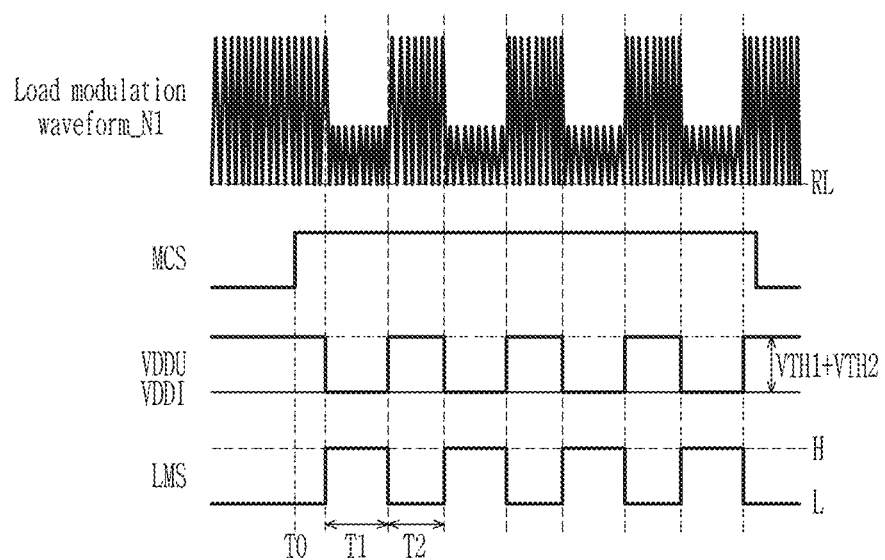
FIG. 7 is a waveform diagram that shows a load modulation waveform, a rectified voltage, a load modulation signal, and a mode control signal according to load modulation in a transmission mode according to at least one example embodiment.

FIG. 7 is a waveform diagram that shows a load modulation waveform, a rectified voltage, a load modulation signal, and a mode control signal according to load modulation in a transmission mode according to at least one example embodiment.

FIG. 7 shows a load modulation waveform generated at the node N1 of the antenna 110 according to at least one example embodiment. A load modulation waveform generated at the node N2 of the antenna 110 may correspond to a waveform symmetrically shifted from the load modulation waveform shown in FIG. 7 based on a dotted line RL, but the example embodiments are not limited thereto.

At time T0, the mode control signal MCS may rise from a low level to a high level (e.g., a low voltage level to a high voltage level, or a low logic level or a high logic level, etc.) according to and/or based on the operation mode signal OMS indicating the transmission mode, but the example embodiments are not limited thereto. Corresponding to the operation mode signal OMS indicating the normal mode, the mode control signal MCS may be at a low level, but the example embodiments are not limited thereto, and for example, the operation mode signal OMS may be at a high level to indicate the normal mode and be at a low level to indicate the transmission mode, etc.

After time T0, the load modulator 150 may generate a load modulation signal LMS according to and/or based on the transmission data TD and supply it to the modulation switch 133, etc. The modulation switch 133 switches according to and/or based on the load modulation signal LMS, and the load of the load circuit 130 may be modulated accordingly. The voltage regulator 180 is implemented in a combined form of the two diodes D1 and D2 and the voltage regulator 183 according to and/or based on the operation mode signal OMS as shown in FIG. 4, but the example embodiments are not limited thereto, and for example, the voltage regulator may be implemented using an alternative design. Then, the waveform of the rectified voltage VDDU is changed to a high or low level according to and/or based on load modulation, and the internal voltage VDDI is maintained constant. In addition, the distortion problem of the load modulation waveform may be improved and/or solved.

During a period T1, when the load modulation signal LMS is at a high level and thus the modulation switch 133 is in an on state, the rectified voltage VDDU may be controlled and/or changed, adjusted, etc., to the level of the internal voltage VDDI. That is, in a situation where the current supplied to the power generator 180 is below a desired low current threshold (e.g., almost 0 and/or close to 0, etc.) during the period T1, the two diodes D1 and D2 are in the off-state such that the rectified voltage VDDU may be controlled by the internal voltage VDDI (low level).

During a period T2, when the load modulation signal LMS is at low level and thus the modulation switch 133 is in the off-state, the rectified voltage VDDU may be controlled at a level as high as the sum of the threshold voltages VTH1 and VTH2 of the two diodes D1 and D2 than the internal voltage VDDI, but is not limited thereto. That is, when the current supplied to the power generator 180 is restored during the period T2, the two diodes D1 and D2 are immediately turned on, unlike the regulator controlled by the feedback method, and the rectified voltage VDDU may be controlled by a voltage (e.g., high level voltage) as high as the threshold voltages (e.g., VTH1+VTH2, etc.) of the two diodes D1 and D2 than the internal voltage VDDI.

Figure 8:
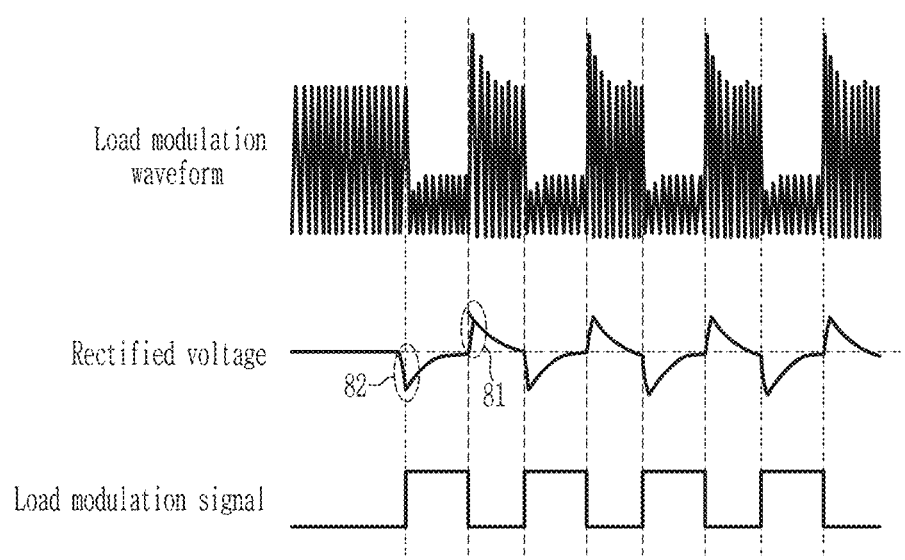
FIG. 8 is a comparative example, which is a waveform diagram showing a load modulation waveform, a rectified voltage, and a load modulation signal when the voltage regulator controls the rectified voltage regardless of the operation mode of the conventional smart card.

FIG. 8 is a comparative example, which is a waveform diagram showing a load modulation waveform, a rectified voltage, and a load modulation signal when the voltage regulator controls the rectified voltage regardless of the operation mode of the conventional smart card.

When the voltage regulator directly regulates the rectified voltage, the current inflow to the voltage regulator varies according to and/or based on the load modulation in transmission mode. As shown in FIG. 8, when the load modulation signal toggles between high and low levels, current fluctuations inflow to the voltage regulator occur, and a feedback loop delay occurs when the voltage regulator constantly regulates the rectified voltage in response to the current fluctuations. In addition, a bandwidth of an operating frequency of an amplifier which forms the voltage regulator is limited. Due to the limitation of feedback loop delay and operating frequency bandwidth, as shown in FIG. 8, an overshoot 81 and an undershoot 82 of the rectified voltage occur. Depending on the overshoot and undershoot of the rectified voltage, overshoot and undershoot may also occur in the load modulation waveform.

On the other hand, in the transmission mode of the smart card 100 according to at least one example embodiment of the inventive concepts, the power generator 180 may control the high level (e.g., high voltage level) and low level (e.g., low voltage level) of the rectified voltage VDDU with a constant voltage difference according to and/or based on load modulation while maintaining the internal voltage VDDI constant. Turning the diode on/off may be performed at a very high speed compared to the conventional method in which a general regulator receives output feedback and controls the diode. Therefore, when the normal mode is changed to the transmission mode, the waveform of the rectified voltage VDDU may be provided as a square wave according to and/or based on the load modulation signal LMS without a delay. Then, since undershoot and/or overshoot does not occur at the nodes N1 and N2, the load modulation waveform provided to the antenna 110 may be a waveform close to a square wave without distortion as shown in the at least one example embodiment of FIG. 7.

The high level of the rectified voltage VDDU may be controlled by the threshold voltages VTH1 and VTH2 of the two diodes D1 and D2, etc. The high level of the rectified voltage VDDU may be adjusted by adjusting the threshold voltages VTH1 and VTH2 of the transistors 811 and 821, respectively. In addition, the high level of the rectified voltage VDDU may be adjusted using a plurality of switching circuits, a plurality of conversion circuits, and/or a combination of the plurality of switching circuits and the conversion circuits, etc.

Figure 9:
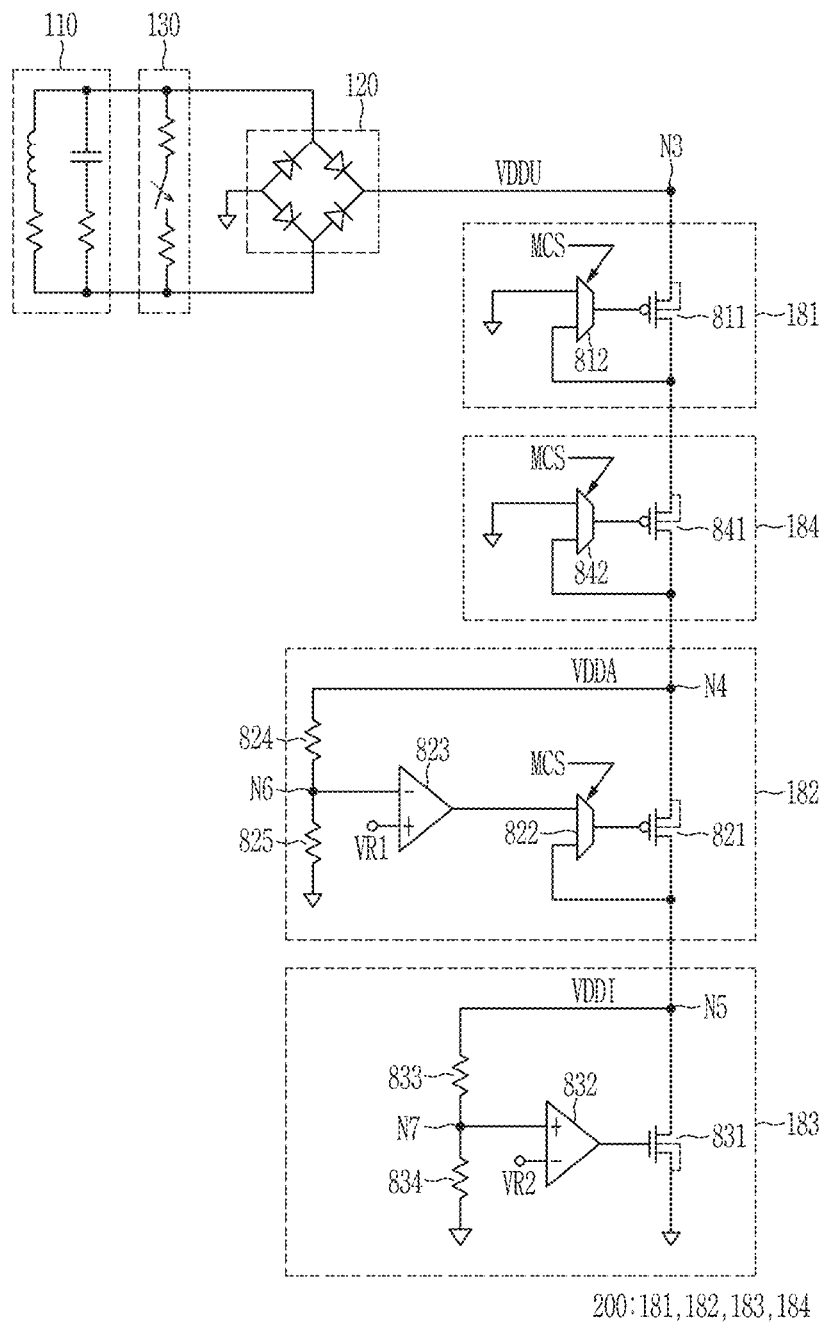
FIG. 9 is a circuit diagram that shows a voltage regulator according to at least one example embodiment.

FIG. 9 is a circuit diagram that shows a voltage regulator according to at least one example embodiment.

Compared to the power generator 180 shown in FIG. 3, a power generator 200 shown in FIG. 9 may further include a switching circuit 184, but is not limited thereto. Since other configurations are the same and/or similar, description of the other configurations is omitted.

The switching circuit 184 may include a transistor 841 and/or a multiplexing circuit 842, etc. The connection relationship between each component in the switching circuit 184 and its operation may be the same and/or similar to those of the above-described switching circuit 181, but is not limited thereto.

The multiplexing circuit 842 may turn on the transistor 841 according to and/or based on the mode control signal MCS corresponding to the normal mode and/or diode-connect the transistor 841 according to and/or based on the mode control signal MCS corresponding to the transmission mode. When the transistor 841 is diode-connected in the transmission mode, the high level of the rectified voltage VDDU may be a voltage (e.g., VDDI+VTH1+VTH2+VTH3, etc.) obtained by adding two threshold voltages VTH1 and VTH2 and a threshold voltage VTH3 of the transistor 841 to the internal voltage VDDI, but the example embodiments are not limited thereto.

Figure 10:
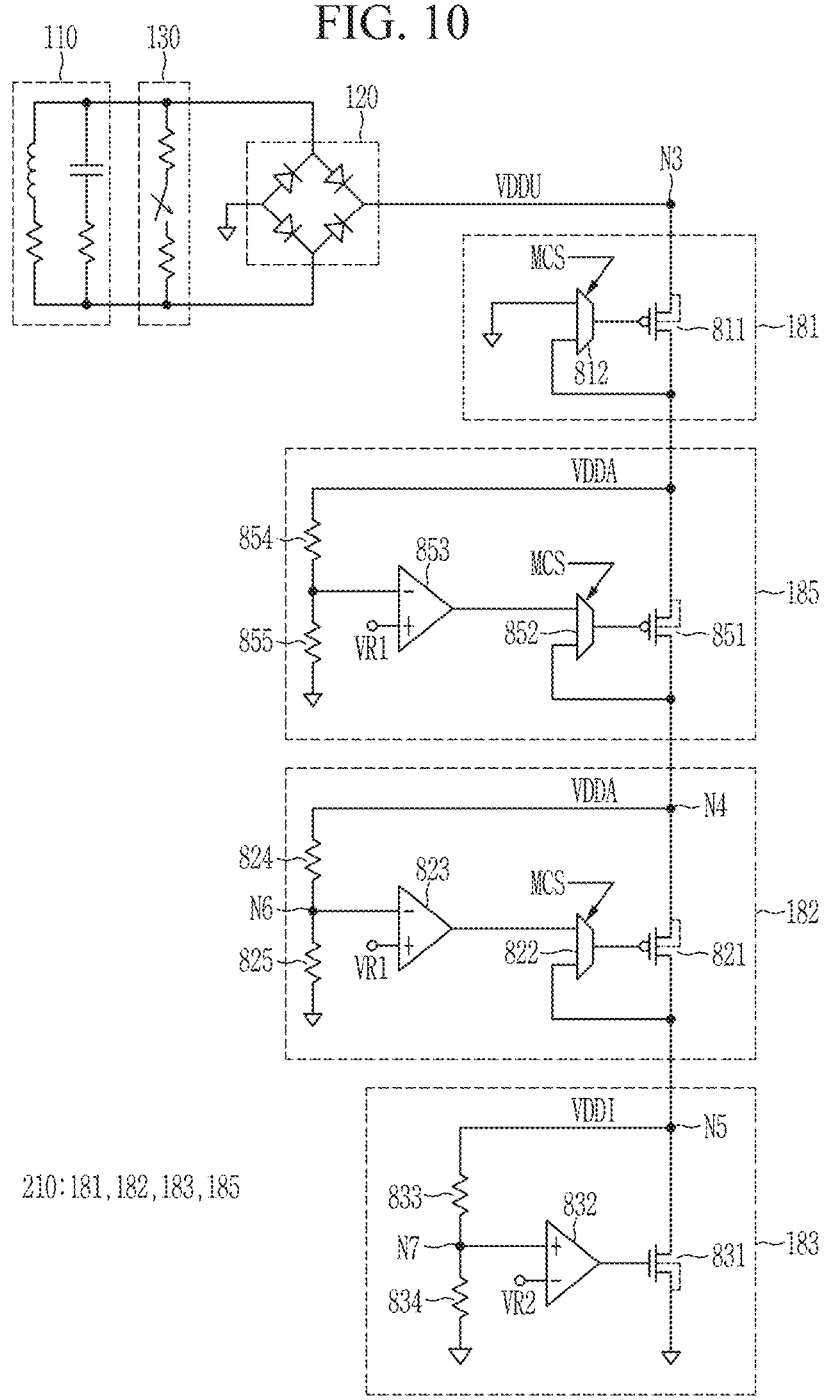
FIG. 10 is a circuit diagram showing a voltage regulator according to at least one example embodiment.

FIG. 10 is a circuit diagram showing a voltage regulator according to at least one example embodiment.

Compared to the power generator 180 shown in FIG. 3, a power generator 210 shown in FIG. 10 may further include a conversion circuit 185, but is not limited thereto. Since other configurations are the same and/or similar, description of the other configurations is omitted.

The conversion circuit 185 may include a transistor 851, a multiplexing circuit 852, an error amplifier 853, and/or two resistors 854 and 855, etc., but is not limited thereto. The connection relationship and operation of each component in the conversion circuit 185 may be the same and/or similar to that of the above-described conversion circuit 182. That is, the conversion circuit 185 may operate as a voltage regulator and/or provide a diode according to and/or based on the mode control signal MCS, etc.

The conversion circuit 185 may operate as a voltage regulator according to and/or based on the mode control signal MCS corresponding to the normal mode and/or provide a diode according to and/or based on the mode control signal MCS corresponding to the transmission mode, etc. When the transistor 851 is diode-connected in the transmission mode, the high level of the rectified voltage VDDU may be a voltage (e.g., VDDI+VTH1+VTH2+VTH4, etc.) obtained by adding two threshold voltages VTH1 and VTH2 and a threshold voltage VTH4 of the transistor 851 to the internal voltage VDDI, but is not limited thereto.

Although not shown, it may be apparent from the above description that the high-level voltage of the rectified voltage VDDU can be adjusted by combining a plurality of switching circuits and/or a plurality of conversion circuits, etc.

While various example embodiments of the inventive concepts have been described, it is to be understood that the inventive concepts are not limited to the disclosed example embodiments. On the contrary, the example embodiments of the inventive concepts are intended to cover various modifications and equivalent arrangements included within the spirit and scope of the appended claims.

What is claimed is:

1. A smart card comprising:
an antenna configured to receive at least one radio signal;
a load circuit that is connected to both ends of the antenna;
a rectifier configured to rectify the at least one radio signal received through the antenna, and provide the rectified signal to an output terminal; and
a power generator including a voltage regulator, a first diode, and a second diode, the voltage regulator configured to provide an internal voltage, the first diode and the second diode connected in series between the output terminal of the rectifier and a first node, and the first node is configured to receive the internal voltage during a first mode of the smart card, the first mode being a mode during which a load of the load circuit is modulated, wherein
the internal voltage is supplied to at least one processor configured to control the smart card,
the load circuit comprises a first resistor, a modulation switch, and a second resistor connected to the both ends of the antenna,
in response to the modulation switch being on, a rectified voltage follows the internal voltage, the rectified voltage being a voltage of the output terminal of the rectifier, and
in response to the modulation switch being off, the rectified voltage follows a voltage obtained based on a threshold voltage of the first diode, a threshold voltage of the second diode, and the internal voltage.

2. The smart card of claim 1, wherein
the first diode is a diode-connected first transistor; and
the second diode is a diode-connected second transistor.

3. The smart card of claim 2, wherein
the first transistor is connected between the output terminal of the rectifier and a second node;
the second transistor is connected between the second node and the first node;
the first transistor is configured to be in an on-state during a second mode of the smart card, the second mode being a mode during which the load of the load circuit is not modulated; and
the second transistor is configured to control a voltage of the second node during the second mode.

4. The smart card of claim 3, wherein the power generator is further configured to:
amplify a difference between a voltage corresponding to the voltage of the second node and a desired reference voltage.

5. The smart card of claim 2, further comprising:
a power controller configured to diode-connect the first transistor and the second transistor during the first mode,
turn on the first transistor, and
control the second transistor to maintain a voltage of a second node at a constant level during a second mode of the smart card during which the load of the load circuit is not modulated.

6. The smart card of claim 1, wherein the voltage regulator is further configured to amplify a difference between a voltage corresponding to the voltage of the first node and a desired reference voltage.

7. A smart card comprising:
an antenna configured to receive at least one radio signal;
a load circuit that is connected to both ends of the antenna;
a rectifier configured to rectify the at least one radio signal received through the antenna, and provide the rectified signal to an output terminal;
a switching circuit connected between the output terminal and a first node;
a conversion circuit connected between the first node and a second node;
a voltage regulator connected to the second node, and the voltage regulator configured to control an internal voltage to be constant, the internal voltage being a voltage of the second node; and
the switching circuit and the conversion circuit are configured to operate as a first diode and a second diode, respectively, during a first mode of the smart card, the first mode being a mode during which the load of the load circuit is modulated, wherein
the internal voltage is supplied to at least one processor configured to control the smart card,
the load circuit comprises a first resistor, a modulation switch, and a second resistor connected to the both ends of the antenna,
in response to the modulation switch being on, a rectified voltage follows the internal voltage, the rectified voltage being a voltage of the output terminal of the rectifier, and
in response to the modulation switch being off, the rectified voltage follows a voltage obtained based on a threshold voltage of the first diode, a threshold voltage of the second diode, and the internal voltage.

8. The smart card of claim 7, wherein the switching circuit comprises:
a transistor connected between the output terminal and the first node; and
a multiplexing circuit which includes an output terminal connected to a gate of the transistor, a first input terminal configured to receive an on-level voltage of the transistor, and a second input terminal connected to a drain of the transistor.

9. The smart card of claim 8, wherein the multiplexing circuit is configured to:
connect the output terminal and the second input terminal during the first mode; and
connect the output terminal and the first input terminal during a second mode of the smart card, the second mode being a mode during which a load of the load circuit is not modulated.

10. The smart card of claim 9, wherein
the conversion circuit is configured to operate as a voltage regulator which maintains the voltage of the first node at a constant level during the second mode.

11. The smart card of claim 7, wherein the conversion circuit comprises:
a transistor connected between the first node and the second node;
an error amplifier configured to amplify a difference between a voltage corresponding to the first node and a desired reference voltage; and
a multiplexing circuit including an output terminal, a first input terminal and a second input terminal, the output terminal connected to a gate of the transistor, the first input terminal connected to the output terminal of the error amplifier, and the second input terminal connected to a drain of the transistor.

12. The smart card of claim 11, wherein the multiplexing circuit is further configured to:
connect the output terminal and the second input terminal during the first mode; and
connect the output terminal and the first input terminal during a second mode of the smart card, the second mode being a mode during which a load of the load circuit is not modulated.

13. The smart card of claim 12, wherein
the switching circuit is in an on-state during the second mode.

14. The smart card of claim 7, wherein the voltage regulator comprises:
a transistor connected to the second node; and
an error amplifier including an output terminal connected to a gate of the transistor, the error amplifier configured to amplify and output a difference between the voltage corresponding to the voltage of the second node and a desired reference voltage.

15. The smart card of claim 7, wherein
during a second mode of the smart card, the second mode being a mode during which a load of the load circuit is not modulated,
the switching circuit is configured to be in an on-state, and
the conversion circuit is configured to operate as a voltage regulator which maintains a voltage of the first node to be constant.

16. The smart card of claim 15, wherein the conversion circuit comprises:
a transistor connected between the first node and the second node; and
an error amplifier configured to, amplify a difference between the voltage corresponding to the first node and a desired reference voltage, and output the amplified difference to a gate of the transistor.

17. The smart card of claim 7, wherein
the load circuit comprises a first resistor, a modulation switch, and a second resistor connected to both ends of the antenna,
in response to the modulation switch being on, the load circuit is configured to adjust a rectified voltage based on the internal voltage, the rectified voltage being a voltage of the output terminal of the rectifier, and
in response to the modulation switch being off, the load circuit is configured to adjust the rectified voltage based on a desired threshold voltage of a diode provided by the switching circuit and a desired threshold voltage of a diode provided by the conversion circuit.

18. A smart card comprising:
an antenna configured to receive at least one radio signal;
a rectifier configured to rectify the at least one radio signal received by the antenna;
a load circuit which is connected to both ends of the antenna, the load circuit including a modulation switch;
a load modulator configured to generate a load modulation signal based on transmission data; and
a power generator including a voltage regulator, the voltage regulator configured to provide a desired internal voltage, and
during a transmission mode of the smart card in which the modulation switch operates based on the load modulation signal,
  the voltage regulator is further configured to adjust a rectifier voltage at an output terminal to a level obtained based on desired threshold voltages of at least two diodes and the internal voltage in response to the modulation switch being on, and set the rectified voltage to the internal voltage in response to the modulation switch being off, the at least two diodes including a first diode and a second diode, wherein
the internal voltage is supplied to at least one processor configured to control the smart card,
the load circuit comprises a first resistor, a modulation switch, and a second resistor connected to the both ends of the antenna,
in response to the modulation switch being on, a rectified voltage follows the internal voltage, the rectified voltage being a voltage of the output terminal of the rectifier, and
in response to the modulation switch being off, the rectified voltage follows a voltage obtained based on a threshold voltage of the first diode, a threshold voltage of the second diode, and the internal voltage.

19. The smart card of claim 18, wherein
the first diode is connected between an output terminal of the rectifier and a first node;
the second diode is connected between the first node and a second node; and
the internal voltage is supplied to the second node.

20. A smart card comprising:
an antenna configured to receive at least one radio signal;
a load circuit that is connected to both ends of the antenna;
a rectifier configured to rectify the at least one radio signal received through the antenna, and provide the rectified signal to an output terminal;
a power generator including a voltage regulator, a first diode, and a second diode, the voltage regulator configured to provide an internal voltage, the first diode and the second diode connected in series between the output terminal of the rectifier and a first node, and the first node is configured to receive the internal voltage during a first mode of the smart card, the first mode being a mode during which a load of the load circuit is modulated, wherein
the internal voltage is supplied to at least one processor configured to control the smart card,
the first diode is a first transistor, and
the second diode is a second transistor; and
a power controller configured to,
  diode-connect the first transistor and the second transistor during the first mode,
  turn on the first transistor, and
  control the second transistor to maintain a voltage of a second node at a constant level during a second mode of the smart card during which the load of the load circuit is not modulated.

* * * * *